United States Patent
Di Grazia

(10) Patent No.: US 9,008,155 B2
(45) Date of Patent: Apr. 14, 2015

(54) REACQUISITION METHOD OF A CDMA MODULATED SATELLITE SIGNALS AND RECEIVING APPARATUS IMPLEMENTING THE METHOD

(71) Applicant: STMicroelectronics S.r.l., Agrate Brianza (IT)

(72) Inventor: Domenico Di Grazia, Cesa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 14/290,449

(22) Filed: May 29, 2014

(65) Prior Publication Data
US 2015/0049791 A1 Feb. 19, 2015

(30) Foreign Application Priority Data
May 30, 2013 (IT) .............................. MI2013A0885

(51) Int. Cl.
| H04B 1/00 | (2006.01) |
| G01S 19/30 | (2010.01) |
| H04B 1/7075 | (2011.01) |
| H04B 1/709 | (2011.01) |

(52) U.S. Cl.
CPC .............. *G01S 19/30* (2013.01); *H04B 1/7075* (2013.01); *H04B 1/709* (2013.01)

(58) Field of Classification Search
USPC ......................................................... 375/149
See application file for complete search history.

(56) References Cited

U.S. PATENT DOCUMENTS

| 2002/0169550 | A1 | 11/2002 | Perlmutter et al. |
| 2006/0154610 | A1* | 7/2006 | Rumney ..................... 455/67.14 |
| 2007/0211793 | A1 | 9/2007 | Han |
| 2008/0020807 | A1* | 1/2008 | Kolano et al. .............. 455/569.1 |
| 2008/0103705 | A1* | 5/2008 | Hammerschmidt ............ 702/57 |
| 2009/0079627 | A1 | 3/2009 | Sun et al. |
| 2009/0264080 | A1* | 10/2009 | Huang et al. ................ 455/67.13 |
| 2012/0083232 | A1* | 4/2012 | Kenington et al. ........ 455/226.1 |

FOREIGN PATENT DOCUMENTS
EP 1 321 774 A1 6/2003

* cited by examiner

*Primary Examiner* — Erin File
(74) *Attorney, Agent, or Firm* — Seed IP Law Group PLLC

(57) ABSTRACT

Acquiring a satellite signal, by, receiving a CDMA-modulated signal; generating a plurality of CDMA-type test signals comprising a reference test signal having a first chip duration, and a plurality of test signals delayed/anticipated of a corresponding time offset from the respective test reference signal, less than the chip duration; calculating correlations between the CDMA-modulated signal and the plurality of test signals for obtaining a plurality of correlation results; selecting, based on the correlation results, acquisition parameters associated to a candidate satellite signal; acquiring or rejecting the acquisition parameters selected based on the correlation results.

24 Claims, 6 Drawing Sheets

REACQUISITION METHOD OF A CDMA MODULATED SATELLITE SIGNALS AND RECEIVING APPARATUS IMPLEMENTING THE METHOD

BACKGROUND

1. Technical Field

The present disclosure refers to satellite positioning systems, and, to acquisition techniques of CDMA-type satellite signals.

2. Description of the Related Art

The satellite signals used in the GNSS (Global Navigation Satellite System) field are CDMA (Code Division Multiple Access) type signals.

The CDMA-modulated signals have a radio frequency carrier amplitude-modulated by a suitable binary sequence known as spreading sequence or pseudo-random code (PRNC: Pseudo Random Noise Code) having a plurality of pulses called chips. The pseudo-random codes have excellent orthogonality properties which enable to distinguish a satellite from another by the same.

The reception of satellite signals from the receiving apparatus comprises the following standard steps, sequentially executed: frequency conversion and digitization, acquisition, tracking, decoding, and positioning.

A radio frequency stage operates on the analog signals received at the satellites and converts them to an intermediate frequency, and an analog/digital converter converts the intermediate frequency $f_{int}$ signals to corresponding digital signals.

The intermediate frequency $f_{int}$ converted signal shows frequency shifts due to shifts of the local oscillator used for the conversion, and due to Doppler effects caused by the satellites and receiving apparatus motions.

During the acquisition of CDMA signals of satellites, there are two main operative conditions: a "Cold Start" state and a "Hot/Warm Start" state.

In the "Cold Start" state, the Doppler shift caused by the satellite and receiving apparatus motions is considered that is completely unknown.

In the "Hot/Warm Start" state, the largest Doppler uncertainty is considered null because in such state it is possible to predict both which are the satellites in view and their speeds by assuming known the position (corresponding to the one available at the preceding turning off) and the time (generated by the inner backup clock).

Further, there is a "reacquisition" state which occurs when the receiving apparatus looses the synchronization with the satellite signal (for example as it occurs when the somebody passes through a tunnel) but it is assumed that it is possible to continuously estimate the code phase of the signal from the satellite with a precision of few chips from the last tracked code, from the elapsed time and from the tracking frequency available before the obscuration.

Document EP-A-1321774 describes a reacquisition method of a satellite signal, and shows an acquisition block performing the generation of a plurality of CDMA reference signals, and calculates the correlation of these signals with a received intermediate frequency signal. The CDMA reference signals have different code phases. Each correlation calculation is parallelly performed in two different processing branches. A first processing branch comprises calculation blocks (accumulation, sum, coherent value formation, filtering, and comparison blocks) operating in time intervals having a duration less than (fast reacquisition) the time intervals during which the blocks (accumulation, sum, incoherent value formation, filtering, and comparison blocks) of the second branch operate (slow reacquisition). The correct code phase is determined in correspondence of that correlation value greater than a threshold value. Particularly, the fast reacquisition is fast for stronger satellite signals, while the slow reacquisition is suitable for signals having lower strengths. In this case, the reacquisition, for that determined satellite, ends and the tracking step starts. When there are no acquisition values greater than the threshold value, the correlations calculation is repeated with reference signals having other code steps (or with an evolution about the prediction code).

BRIEF SUMMARY

The Applicant has observed that the method described in document EP-A-1321774 does not address preventing interfering radio frequency signals, that is noise signals, from being acquired, and therefore subjected to processing steps after the reacquisition, such as to tracking, decoding, and positioning steps.

In an embodiment, a reacquisition method of a satellite signal comprises: receiving a CDMA-modulated signal; generating a plurality of CDMA-type test signals comprising a reference test signal having a first chip duration, and a plurality of test signals delayed/anticipated of a corresponding offset time from the respective test reference signal, less than the chip duration; performing a correlation calculation between the CDMA-modulated signal and the plurality of test signals obtaining a plurality of correlation results; selecting, based on the correlation results, acquisition parameters associated with a candidate satellite signal; acquiring or rejecting the selected acquisition parameters based on the correlation results. In an embodiment, the method includes analyzing a maximum result and minimum result of said plurality of correlation results, wherein acquiring or rejecting the selected acquisition parameters comprises acquiring or rejecting said selected acquisition parameters from the analysis of the maximum and minimum results. In an embodiment, generating the plurality of the delayed/anticipated test signals comprises: generating a first anticipated test signal and a first delayed test signal, respectively delayed/anticipated of a first offset time with respect to the reference test signal, wherein said first offset time is less than the chip duration. In an embodiment, generating the plurality of delayed/anticipated test signals further comprises: generating a second anticipated test signal, and a second delayed test signal, respectively delayed/anticipated of a second offset time with respect to the reference test signal, wherein said second offset time is less than the chip duration and is greater than the first offset time. In an embodiment, analyzing a maximum and minimum results comprises: calculating a ratio between the maximum result and minimum result of said plurality of correlations results; acquiring or rejecting the acquisition parameters from an analysis of said ratio. In an embodiment, analyzing a maximum and minimum results further comprises: comparing said ratio with a first discrimination value; acquiring or rejecting the selected acquisition parameters from said comparison with a first discrimination value. In an embodiment, selecting the acquisition parameters comprises: comparing said maximum result with a first threshold; identifying the acquisition parameters if the maximum result is greater than the threshold. In an embodiment, analyzing a maximum and minimum results comprises: if said ratio is greater than the first discrimination value: discriminating between a situation of absence of noise signal or a situation of possible presence of noise signal based on the distribution of the maximum and minimum results among said test signals; acquiring the selected parameters if said discrimination detects a situation of absence of noise signal; generating a signal of possible noise if said discrimination detects a situation of possible presence of noise signal. In an embodiment, analyzing a maximum and minimum results comprises: comparing said ratio with a second discrimination value less than said first discrimination value, if said ratio is less than first discrimination value; generating a signal of detection of a possible noise, if said ratio is not less than second discrimination value, rejecting the acquisition of the selected acquisition parameters, if said ratio is not greater than second discrimination value. In an embodiment, the selected and acquired parameters are suitable for a tracking processing. In an embodiment, the calculation of the correlations comprises: multiplying CDMA-modulated signal by one of said test signals to obtain a multiplication digital signal; integrating the multiplication digital signal to obtain one of said correlation results. In an embodiment, said integration occurs according to at least one of the following modes: broad band mode, narrow band mode. In an embodiment, generating a reference test signal comprises: generating the reference test signal based on CDMA parameters estimated by an estimation module. In an embodiment, generating a reference test signal comprises: generating the reference test signal based on CDMA parameters obtained by a satellite signals acquisition module.

In an embodiment, a receiving apparatus of a satellite positioning system, comprises: an antenna for receiving a CDMA-modulated signal, a receiving analog module connected to said antenna for converting the CDMA-modulated signal to a digital CDMA-modulated signal; a reacquisition module comprising: a generation module configured to generate a plurality of CDMA-type test signals comprising a reference test signal, having a first chip duration, and a plurality of test signals delayed/anticipated of a corresponding offset time with respect to the reference test signal less than the chip duration; a correlation module configured to calculate the correlations between the CDMA-modulated signal and the plurality of test signals to obtain a plurality of correlation results; a decisional module configured to: select, based on the correlation results, acquisition parameters associated to a candidate satellite signal; acquire or reject the candidate signal based on the correlation results. In an embodiment, said decisional module is further configured to: analyze a maximum and minimum result of said plurality of correlation results; acquire or reject the selected acquisition parameters from the analysis of the maximum and minimum results.

In an embodiment, a method comprises: receiving a CDMA-modulated signal; generating a plurality of CDMA-type test signals including a reference test signal having a chip duration, and a plurality of delayed/anticipated test signals offset from the reference test signal by less than the chip duration; generating a plurality of correlation results between the CDMA-modulated signal and respective CDMA-type test signals of the plurality of CDMA-type test signals; selecting one of the plurality of CDMA-type test signals based on the plurality of correlation results; and determining whether to accept one or more acquisition parameters associated with the selected CDMA-type test signal based on the plurality of correlation results. In an embodiment, determining whether to accept one or more acquisition parameters comprises: analyzing a maximum correlation result and minimum correlation result of said plurality of correlation results. In an embodiment, generating the plurality of the delayed/anticipated test signals comprises: generating a first delayed test signal and a first anticipated test signal, respectively delayed/anticipated with respect to the reference test signal by a first offset. In an embodiment, generating the plurality of delayed/anticipated test signals comprises: generating a second delayed test signal, and a second anticipated test signal, respectively delayed/anticipated with respect to the reference test signal by a second offset less than the chip duration and greater than the first offset. In an embodiment, the method comprises: calculating a ratio between the maximum correlation result and the minimum correlation result of said plurality of correlations results; and determining whether to accept one or more acquisition parameters based on said ratio. In an embodiment, the method comprises: comparing said ratio with a first discrimination value; and determining whether to accept one or more acquisition parameters based on the comparison of the ratio with the first discrimination value. In an embodiment, the method comprises: comparing said maximum correlation result with a first threshold; and when the maximum correlation result exceeds the first threshold, identifying one or more parameters of the CDMA-type test signal associated with the maximum correlation result as candidate acquisition parameters. In an embodiment, the method comprises, when said ratio is greater than the first discrimination value: generating an indication of a noise condition when a distribution of the maximum correlation result and the minimum correlation result among the plurality of CDMA-type test signals is consistent with a noise condition; and identifying one or more parameters of the CDMA-type test signal associated with the maximum correlation result as candidate acquisition parameters when the distribution of the maximum correlation result and the minimum correlation result among the plurality of CDMA-type test signals is inconsistent with a noise condition. In an embodiment, the method comprises, when said ratio is less than the first discrimination value: comparing said ratio with a second discrimination value less than said first discrimination value; generating a filter activation signal when the ratio is greater than the second discrimination value; and rejecting the one or more acquisition parameters when the ratio is less than the second discrimination value. In an embodiment, the method comprises: using accepted acquisition parameters in signal source tracking. In an embodiment, generating the plurality of correlation results comprises: multiplying the CDMA-modulated signal by one of said test signals to obtain a multiplication digital signal; integrating the multiplication digital signal to obtain one of said correlation results. In an embodiment, said integration comprises at least one of broad band integration and narrow band integration. In an embodiment, the method comprises: generating the reference test signal based on CDMA parameters estimated by an estimation module. In an embodiment, the method comprises: generating the reference test signal based on CDMA parameters obtained by a satellite signal acquisition module.

In an embodiment, a system comprises: an antenna configured to receive CDMA-modulated signals; a receiver coupled to said antenna and configured to convert CDMA-modulated signals to a digital CDMA-modulated signals; and an acquisition module coupled to the receiver and having: a test signal generator configured to generate a plurality of CDMA-type test signals including a reference test signal having a first chip duration, and a plurality of delayed/anticipated test signals offset from the reference test signal by less than the chip duration; a correlation module configured to generate a plurality of correlation results between the CDMA-modulated signal and respective CDMA-type test signals of the plurality of CDMA-type test signals; a selection module configured to select one of the plurality of CDMA-type test signals based on the plurality of correlation results; and a determining module configured to determining whether to accept one or more acquisition parameters associated with the selected CDMA-type test signal based on the plurality of correlation results. In an embodiment, the acquisition module is configured to: select, based on the correlation results, acquisition parameters associated to a candidate satellite signal; and acquire or reject the candidate signal based on the correlation results. In an embodiment, the acquisition module is configured to: analyze a maximum and minimum result of said plurality of correlation results; and acquire or reject the selected acquisition parameters based on the analysis of the maximum and minimum results.

In an embodiment, a device comprises: a test signal generator configured to generate a plurality of CDMA-type test signals including a reference test signal having a first chip duration, and a plurality of delayed/anticipated test signals offset from the reference test signal by less than the chip duration; a correlation module configured to generate a plurality of correlation results between a CDMA-modulated signal and respective CDMA-type test signals of the plurality of CDMA-type test signals; a selection module configured to select one of the plurality of CDMA-type test signals based on the plurality of correlation results; and a determining module configured to determining whether to accept one or more acquisition parameters associated with the selected CDMA-type test signal based on the plurality of correlation results. In an embodiment, the determining module is configured to determine whether to accept the one or more acquisition parameters based on a maximum correlation result and minimum correlation result of said plurality of correlation results. In an embodiment, the determining module is configured to: calculate a ratio between the maximum correlation result and the minimum correlation result of said plurality of correlations results; and determining whether to accept one or more acquisition parameters based on said ratio. In an embodiment, the determining module is configured to: compare said ratio with a first discrimination value; and determine whether to accept one or more acquisition parameters based on the comparison of the ratio with the first discrimination value. In an embodiment, the determining module is configured to, when said ratio is greater than the first discrimination value: generate an indication of a noise condition when a distribution of the maximum correlation result and the minimum correlation result among the plurality of CDMA-type test signals is consistent with a noise condition; and identify one or more parameters of the CDMA-type test signal associated with the maximum correlation result as candidate acquisition parameters when the distribution of the maximum correlation result and the minimum correlation result among the plurality of CDMA-type test signals is inconsistent with a noise condition. In an embodiment, the determining module is configured to, when said ratio is less than the first discrimination value: compare said ratio with a second discrimination value less than said first discrimination value; generate a filter activation signal when the ratio is greater than the second discrimination value; and reject the one or more acquisition parameters when the ratio is less than the second discrimination value. In an embodiment, the determining module is configured to: compare said maximum correlation result with a first threshold; and when the maximum correlation result exceeds the first threshold, identify one or more parameters of the CDMA-type test signal associated with the maximum correlation result as candidate acquisition parameters.

BRIEF DESCRIPTION OF THE SEVERAL VIEWS OF THE DRAWINGS

For a better comprehension of the disclosure and an appreciation of possible advantages of various embodiments, in the following some non-limiting exemplifying embodiments thereof will be described with reference to the attached drawings, wherein.

DETAILED DESCRIPTION

Figure 1:
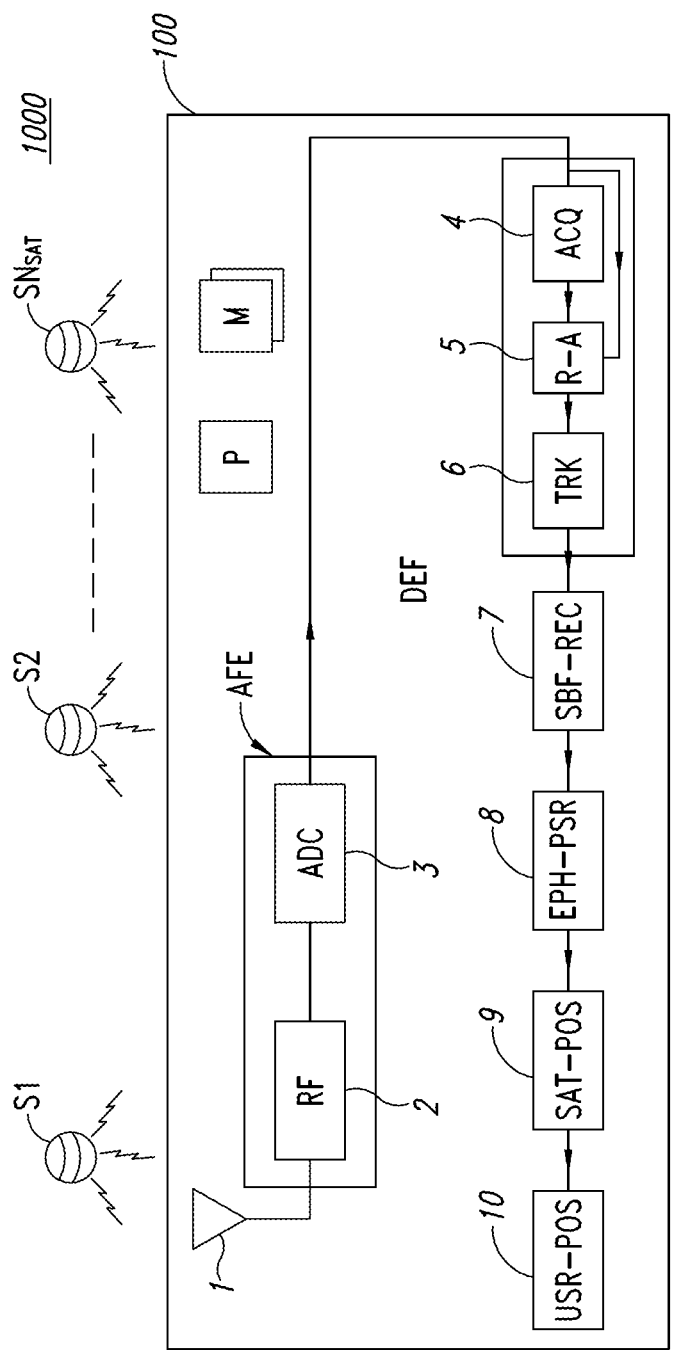
FIG. 1 schematically shows a satellite positioning system comprising a receiving apparatus.

FIG. 1 schematically shows a system GNSS 1000 (Global Navigation Satellite System) suitable for use in, for example, the Global Positioning System (GPS), the Global'naya Navigatsionnaya Sputnikovaya System (GLONASS), the Galileo System, or other types of satellite-based positioning systems.

The global satellite positioning system 1000 comprises a constellation of satellites S1-SN$_{sat}$ and at least one receiving apparatus 100. In a particular implementation, the receiving apparatus 100 comprises an antenna 1, a receiving analog module AFE, provided with a radio frequency stage 2 (RF), and an analog/digital converter 3 (ADC), which may be implemented by hardware modules.

The receiving apparatus 100 further comprises a digital processing module DFE, comprising an acquisition module 4 (ACQ), a reacquisition module 5, and a tracking module 6 (TRK).

Moreover, receiving apparatus 100 is provided with a sub-frame recovery module 7 (SBF-REC), an ephemeris processing and pseudo-range calculation module 8 (EPH-PSR), a satellite position calculation module 9 (SAT-POS), and a user position calculation module 10 (USR-POS).

In an embodiment, acquisition module 4, reacquisition module 5, and tracking module 6 may be implemented by hardware, while remaining modules 7-10 may be implemented by software.

Receiving apparatus 100 is provided with a central processing unit P, memories (mass storage and/or working memory) M and of corresponding interfaces (not shown in figures). For example, a microprocessor or microcontroller, for executing the software stored in a memory.

The following implementations are described in a non-limiting way to the GPS technology, anyway the teachings of the present description can be applied also to other satellite positioning systems.

When the receiving apparatus 100 is operating, antenna 1 receives a plurality of signals from one or more satellites S1-SN$_{sat}$ of the satellites constellation operating in system 1000. For example, these signals are modulated on a carrier with frequency of 1.5 GHz. In particular, each received signal carries a pseudo-random code and a message for communicating data.

Pseudo-random code, known as CA code, for example at 1 MHz, is used for distinguishing one satellite from the other and enables the receiving apparatus 100 to measure the time instant at which has been transmitted the signal from the corresponding satellite. Pseudo-random code is implemented by a sequence of pulses called chips.

The data navigation message carries data (for example at a bit rate equal to 50 Hz) and in particular is modulated based on the Binary Phase Shift Keying (BPSK) technique. Further, the data navigation message is hierarchically divided in frames and sub-frames, and carries information, which includes a plurality of parameters used for determining the orbit and consequently the satellite's position.

The radio frequency stage 2 operates on signals received from antenna 1 (of the analog type) and converts them into a base band or an intermediate frequency. The analog/digital converter 3 converts the intermediate frequency signals in corresponding digital signals.

Acquisition module 4 is configured to detect, based on the digital output signals from analog/digital converter 3, which satellites in the constellation S1-$SN_{sat}$ are visible, in other words satellites from which a signal suitable to identify the satellite have been received. Further, acquisition module 4 detects a plurality of parameters, associated to satellites, and used for tracking a satellite with time.

Reacquisition module 5, as it will be better described in the following, operates in reacquisition conditions and, besides confirming the identification of a visible satellite or not, supplies the tracking module 6 parameters associated to the satellites, and used for tracking a satellite with time.

Tracking module 6 has several channels, and each channel is allocated to a different satellite. Tracking module 6 may be configured to operate as a frequency-locked loop. In an embodiment, tracking module 6 may be configured to implement a phase-locked loop.

Tracking module 6 is configured to supply data to the sub-frame recovery module 7, as a time sequence of sample pairs, indicated as {I,Q}. Each sample {I,Q} is, for example, the result of a coherent integration respectively in-phase and quadrature, of one bit of 20 msec, performed by a correlator. Based on the Binary Phase Shift Keying (BPSK) modulation technique, each pair of samples {I,Q} represents a transmitted bit.

As it is well known in the field of the digital communications theory, each sample {I,Q} can be further regarded as a phasor, considering the values I and Q as the real part and imaginary part of a two-dimensional vector in the complex Cartesian plane.

Further, for each satellite, in the tracking module 6, the Doppler frequency and the time necessary for transferring the GPS signal transmitted from a satellite S1-$SN_{sat}$ are determined.

The sub-frame recovery module 7, by suitable algorithms, decodes the different received sub-frames forming the navigation data message. The ephemeris processing and pseudo-range calculation module 8 stores the satellite orbit, as ephemeris data. The ephemeris processing and pseudo-range calculation module 8 calculates the existing distances among the satellites and receiving apparatus 100; such distance is known as pseudo-range. Among these calculated values, and by the GPS signal transferring time, the satellite position calculation module 9 calculates the satellites' positions expressed with three-dimensional coordinates, at the transmission.

In this implementation, the satellite positioning calculation module 9 operates, based on the GPS signal transferring time with the reception time (known thanks to a clock inside the receiving apparatus 100). The satellite position calculation module 9 operates in order to evaluate how much time is necessary to the signal from each satellite to reach the receiving apparatus 100, evaluating in this way the distance from the respective satellite (pseudo-range).

By means of a triangulation algorithm, the user position calculation module 10 calculates the position of the receiving apparatus 100 based on the distances of the receiving apparatus 100, for example, from at least four satellites, and based on the positions of the same satellites, known at this processing stage. In the following, the receiving apparatus 100 position (substantially coinciding with the user position) will be known as "fix".

Figure 2:
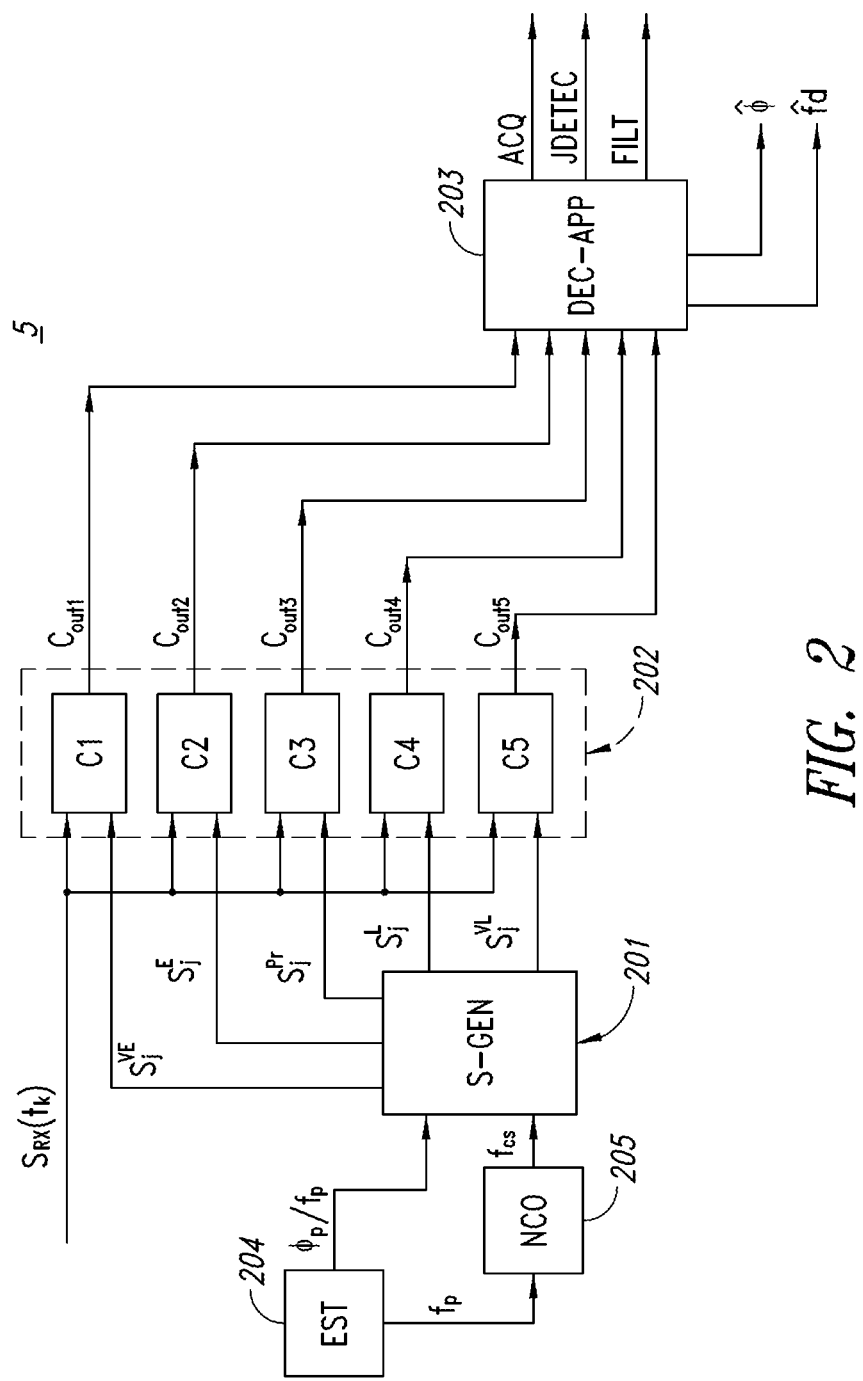
FIG. 2 schematically shows a reacquisition module of said receiving apparatus.

Referring now to the reacquisition module 5, FIG. 2 shows a particular embodiment of the reacquisition module 5 comprising: a test signals generation device 201 (S-GEN), a correlators bank 202 (C1-C5), and a decisional module 203 (DEC-APP).

As illustrated, the acquisition module 5 is also provided with a prediction module 204 (EST) and sinusoidal signals generator 205, such as a numerically controlled oscillator (NCO).

Estimating module 204 is configured to supply data identifying a satellite Sj candidate to the reacquisition among satellites S1-$SN_{sat}$, and therefore supplies an estimated code phase $\phi_p$, and an estimated frequency $f_p$ corresponding to the same parameters of CDMA signal associated to satellite Sj. This estimate may be obtained by an inverse triangulation (according to modes known to a person skilled in the art) from an available position, from the satellite ephemerides and time information. Numerically controlled oscillator 205 makes available at the test signals generation device 201 a carrier having a carrier frequency $f_{cs}$ equal to the estimated frequency $f_p$ plus the intermediate frequency $f_{int}$ of the radio frequency stage 2. For example, if the estimated frequency $f_p$ is equal to 2 kHz, and intermediate frequency is equal to 4 MHz, then the carrier supplied by the numerically controlled oscillator 205 is equal to 4.002 MHz.

Test signals generation device 201 is configured to generate a plurality of test signals comprising a reference or prompt signal $s_j^{pr}(t_k)$, corresponding to the CDMA-modulated signal of the type found in formula (1) having an estimated code phase $\phi_p$ and an estimated carrier frequency $f_p$ except for the intermediate frequency $f_{int}$.

Moreover, the test signals generation device 201 is configured to generated at least one anticipated test signal $s_j^{E}(t_k)$ and at least one delayed test signal $s_j^{L}(t_k)$, having the same parameters as prompt signal sir $(t_k)$, but with corresponding code phases $\phi_E$ and $\phi_L$ delayed/anticipated of a first offset $\pm\Delta\phi_{EL}$ with respect to the estimated code phase $\phi_p$.

The absolute value of first offset $\pm\Delta\phi_{EL}$ is less than the estimated code phase $\phi_p$, or in other words, this first offset $\pm\Delta\phi_{EL}$ is inside the chip of the spreading code.

According to an example regarding the case of a GPS system, the spreading sequence of the CDMA-modulated signal has 1023 elementary chips (pulses) repeating each millisecond. Therefore, each pulse or chip of spreading sequence has a duration Ts of 1 ms/1023~1 µs. In this particular example, the analog/digital converter 3 (FIG. 1) may be configured to convert the signals received from satellite at an intermediate frequency to corresponding digital signals by applying an over-sampling and therefore, for example, with a sampling period $T_{samp}$ equal to ⅛ of period Ts; this enables to define the "code sub-steps" temporally translated of ⅛ the chip duration Ts, in other words ⅛ μs, or in terms of phase of ⅛ radiant.

Therefore, the first offset $\pm\Delta\phi_{EL}$ can be selected equal to one of such sub-steps in order to be less, considered as an absolute value, than 1 μs and, for example, equal to an integer multiple of ⅛ μs.

Specifically, the anticipated test signal $s_j^E(t_k)$ is anticipated from the prompt signal $s_j^{pr}(t_k)$, while the delayed test signal $s_j^L(t_k)$ is delayed from prompt signal $s_j^{pr}(t_k)$.

In an embodiment, the test signals generation device 201 is configured to generated at least a third more anticipated test signal $s_j^{VE}(t_k)$ and at least a fourth more delayed test signal $s_j^{VL}(t_k)$ having the same parameters as the prompt signal $s_j^{pr}(t_k)$, but with corresponding code phases $\phi_{VE}$ e $\phi_{VL}$ delayed/anticipated of a second offset $\pm\Delta\phi_{VEL}$ with respect to the estimated code phase $\phi_p$.

The second offset $\Delta\phi_{VEL}$ corresponds to a time delay/lead greater than the one associated to the first offset $\Delta\phi_{EL}$ but anyway less than the duration of chip Ts.

In the example described with reference to the figures, test signals generation device 201 generates a single prompt signal $s_j^{pr}(t_k)$, and four offset test signals ($s_j^{VE}(t_k)$ $s_j^E(t_k)$ $s_j^L(t_k)$ $s_j^{VL}(t_k)$) but it is possible also to generate a different number of offset test signals. Therefore, also the number of correlators received in the correlators bank 202 can be different from five.

Correlators bank 202 comprises a plurality of correlators and, particularly, comprises: a first correlator C1, a second correlator C2, a third correlator C3, a fourth correlator C4, and a fifth correlator C5. Such correlators C1-C5 may be structurally identical one to the other and each of them is provided with a first input to receive a digital signal $s_{RX}(t_k)$ to be acquired, which is a result of the sum of the signals transmitted from satellites S1-SN$_{sat}$, arrived at antenna 1 and converted to an intermediate frequency $f_{IF}$ (or to a base band) and digitally converted by the receiving analog module AFE (FIG. 1).

Moreover, each correlator C1-C5 is provided with a corresponding input to receive a respective test signal {$s_j^{VE}(t_k)$, $s_j^E(t_k)$, $s_j^{pr}(t_k)$, $s_j^L(t_k)$, $s_j^{VL}(t_k)$}, generated by the test signals generation device 201.

As it is known to the person skilled in the art, the CDMA-modulated signals have a radio frequency $f_c$ carrier which is amplitude-modulated by a suitable binary sequence called spreading sequence or pseudo-random code (PRNC, Pseudo Random Noise Code) (D(t)) having a code period T. A CDMA-modulated signal $s^n(t)$ of this type, transmitted from the n-th satellite characterized by a pseudo-random code $D^n(t)$ may be mathematically represented by the following formula:

$$s^n(t) = D^n(t) \times \cos(2\pi f_c t + \phi) \quad (1)$$

Antenna 1 of receiving apparatus 100 receives a signal s(t) given by a sum of signals of the type expressed in formula (1), specifically one for each satellite visible from the receiving apparatus 100, and expressed by the following formula:

$$s(t) = \sum_{n=0}^{M-1} s^n(t) \quad (2)$$

wherein M represents the number of satellites visible from receiving apparatus 100.

The reacquisition module 5 receives the digital signal $s_{RX}(t_k)$ corresponding to the one of formula (2), translated to an intermediate frequency $f_{IF}$, sampled and digitally converted in its in-phase $s_I(t_k)$ and quadrature $s_Q(t_k)$ components:

$$s_I(t_k) = \sum_{n=0}^{M-1} D^n(t_k) \times \cos(2\pi f_{IF} t_k + \phi)$$

$$s_Q(t_k) = \sum_{n=0}^{M-1} D^n(t_k) \times \sin(2\pi f_{IF} t_k + \phi)$$

$$s_{RX}(t_k) = \sum_{n=0}^{M-1} s_I^n(t_k) + j s_Q^n(t_k)$$

Referring, as an example, to the third correlator C3, the basic formula of such correlator is:

$$\sum_{k=0}^{N-1} s_{RX}(t_k) \cdot s_j^{pr}(t_k) \quad (3)$$

Formula (3) expresses the correlation operation and therefore a numerical-type coherent integration operation (in other words, a time discrete). Such coherent integration is defined by the summation extended to a time interval of coherent integration $T_{int}$, of the values obtained by the product of samples of the signal $s_{RX}(t_k)$ entering the reacquisition module 5 and the samples of a test signal $s_j^{pr}(t_k)$ reproduced inside the reacquisition module 5.

The coherent integration time interval $T_{int}$ is given by one or more code periods T:

$$T_{int} = m*T = m*N*T_s \quad (4)$$

wherein:
N is the number of chips contained inside each pseudo-random code,
$T_s$ is the duration of an elementary chip of the pseudo-random code, submultiple of the sampling period during which the analog/digital converter 3 operates,
m is a design parameter defining the number of code periods T during which the correlation operation corresponding to formula (3) extends.

Referring for example to the acquisition of a signal from the j-th satellite $S_j$, to the test signal $s_j^{pr}(t_k)$ is associated the pseudo-random code $D_k^j$ of the j-th satellite, a suitable code phase $\phi_j=1$ and a suitable test intermediate frequency $t_p$, determining the following equation of the test signal:

$$s_j^{pr}(t_k) = D_{mod(k+\phi_j N)}^j \cdot \exp(j2\pi f_p t_k + \alpha) \quad (5)$$

wherein $\alpha$ is an arbitrary phase of the test signal as generated by the test signals generation device 201.

Each correlator C1-C5 of the correlators bank 202 is further provided with a corresponding output at which it is available the result $C_{out1}$-$C_{out5}$ of the corresponding correlation operation. Correlators bank 202 can be also used, if suitably configured, by the tracking module 6.

Decisional module 203 is configured to receive at its inputs the correlation results $C_{out1}$-$C_{out5}$ from the correlators bank 202 and is configured to execute a logic controlling the reacquisition process, which will be described in the following. Specifically, decisional module 203 is configured to generate the following output signal (whose function will be explained in the following):
 a reacquisition signal ACQ,
 a noise detecting signal JDETEC,
 a filtering activation signal FILT.

For example, such output signals are binary signals adapted to take an enabling value and a disabling value.

Moreover, decisional module 203 is capable of supplying, based on the correlation results $C_{out1}$-$C_{out5}$, also a calculated Doppler shift value $\hat{f}_d$ and a selected code phase value $\hat{\phi}$, to be made available to tracking module 6.

Decisional module 203 may be implemented, for example, as a software component executable by a microprocessor.

Figure 3:
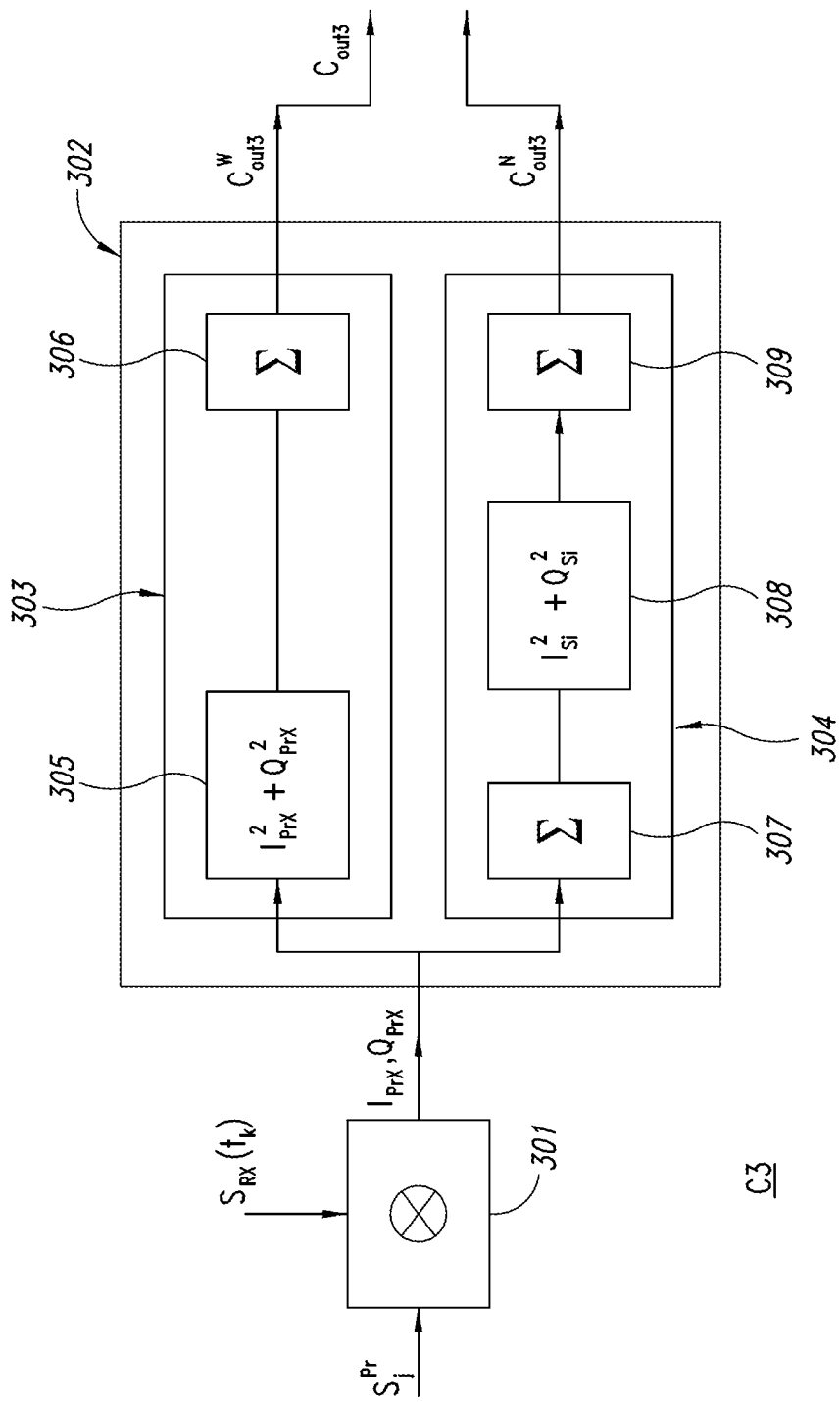
FIG. 3 schematically shows a correlator of said reacquisition module.

FIG. 3 shows an example of embodiment of the third correlator C3 of correlators bank 202, which comprises a multiplier module 301 and an integration module 302. Multiplier module 301 is connected to the first input in order receive the digital signal $s_{RX}(t_k)$ to be acquired, and to a second input for receiving the prompt signal $s_j^{pr}(t_k)$.

Multiplier module 301 is configured to multiply the digital values of in-phase and quadrature components of the signals at its inputs, according to the multiplication operation given by formula (3), and supply at its output an in-phase digital signal $I_{prx}$, and a quadrature digital signal $Q_{prx}$ corresponding to the in-phase and quadrature components, respectively, of the result of such multiplication.

A first output of multiplier device 301 is connected to the integration module 301 which may execute an integration according to the one indicated in formula (3). For example, integration module 302 is configured to execute a coherent-type integration (that is a narrow band integration) and/or incoherent-type integration (that is a broad band integration).

In the particular implementation shown in FIG. 3, integration module 302 comprises a broad band integration module 303 and a narrow band integration module 304 and is configured to parallelly execute both the broad band integration and narrow band integration of digital signals $I_{prx}(t_k)$ and $Q_{prx}(t_k)$.

Broad band integration module 303 comprises a first power calculation module 305 and a first summing module 306. The first power calculation module 305 is configured to calculate a plurality of power values $P_i(t_i)$, wherein each power value is the sum of the square of the digital in-phase signal $I_{prx}(t_k)$ evaluated in a particular sampling instant and of the value of the square of the quadrature digital signal $Q_{prx}(t_k)$:

$$P_i(t_i)=I_{prx}^2(t_i)+Q_{prx}^2(t_i) \quad (7)$$

The first summing module 306 is configured to execute the sum of the plurality of power values $P_i(t_i)$, calculated in an incoherent integration interval $T_{inc}$ for obtaining a broad band correlation result $C^W_{out3}$. Specifically, such incoherent integration interval $T_{inc}$ is selected based on strategies logics and is therefore limited to the maximum time in which it is supplied a result to the decisional module 203, typically each 64 msec and at most after 512 msec. According to the example, in the broad band integration, samples are immediately converted into power and then the result is accumulated.

Narrow band integration module 304 comprises a second summing module 307, a second power calculation module 308 and a second adder 309.

Second summing module 307 is configured to form a plurality of cumulative in-phase values $Is_i$ and a plurality of quadrature cumulative values $Qs_i$. Each in-phase cumulative value $Is_i$ (quadrature cumulative value $Qs_i$) is given by the sum of a plurality of values taken by the in-phase digital signal $I_{prx}(t_i)$ (quadrature digital signal $Q_{prx}(t_i)$) in a corresponding integration time interval Tint. Each in-phase cumulative value $Is_i$ (quadrature cumulative value $Qs_i$) is obtained by summing samples during consecutive time intervals.

Second power calculation module 308 is such to calculate a plurality of power cumulative values $Ps_i$ from the plurality of cumulative in-phase values $Is_i$ and from the plurality quadrature cumulative values $Qs_i$, according to the following formula:

$$Ps_i=Is_i^2+Qs_i^2 \quad (8)$$

Second adder 309 is configured to sum the plurality of power cumulative values $Ps_i$ one to the other to obtain a narrow band correlation result $C^N_{out3}$. According to the described example, the narrow band correlation result $C^N_{out3}$ and the broad band correlation result $C^W_{out3}$ are available to the decisional module 203 in order to form a third output $C_{out3}$ of the third correlator C3. According to the example, in the narrow band integration, consecutive samples are summed before evaluating the accumulated signal power.

For example, integration module 302 is such to generate a broad band correlation result or a narrow band correlation result each 64 msec. After a total of 512 msec (equal to 64 msec×8) the calculated powers are reset. In the broad band branch, each elementary sample lasts for 1 msec, in the narrow band branch, in the GPS case, 8 samples are summed and then the normalized power is evaluated.

Figure 4:
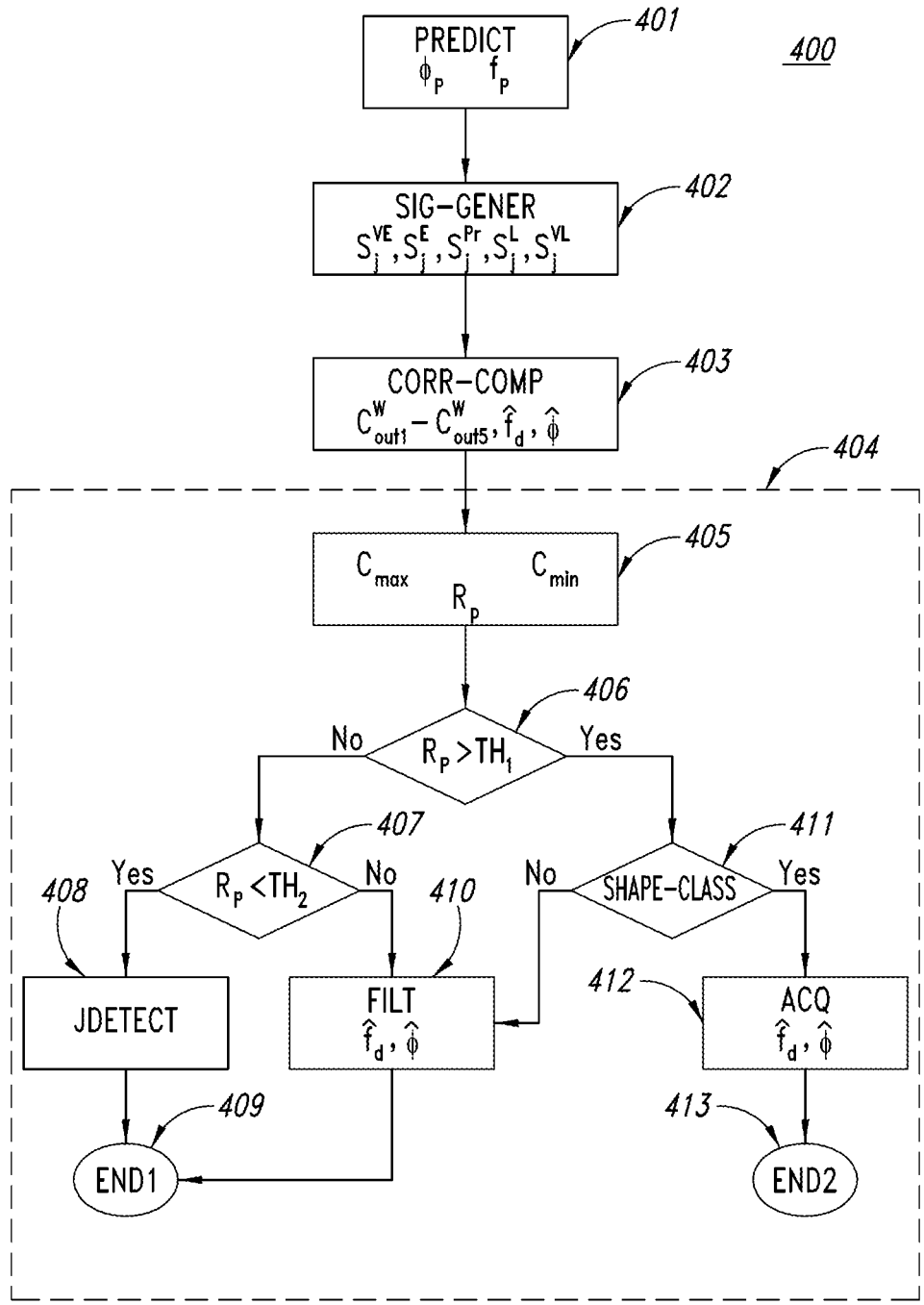
FIG. 4 is a flow diagram of a reacquisition method implementable by the reacquisition module of FIG. 2.

FIG. 4 shows an example of a reacquisition method 400 implementable by the above described reacquisition module 5. For example, it is considered the case wherein the receiving apparatus 100, after having received a signal from a satellite S1-SN$_{sat}$ and therefore being synchronized with such satellite, is in a state wherein such synchronization has been lost. In fact, for example, since the receiving apparatus 100 is moving, the variations of the surrounding environment can cause modifications of the strength in the signal from the satellite. Particularly, this can occur when somebody enters a tunnel or moves inside a building.

Receiving apparatus 100, since it has lost the synchronization with the signal from a satellite, performs, as soon as possible, a reacquisition of a weakened signal in order to facilitate avoiding a need to again perform a complete acquisition procedure by the acquisition module 4.

In the reacquisition state, it is assumed the receiving apparatus 100 can estimate the code phase of the signal from the satellite with a precision of few chips.

In a prediction step 401, the prediction module 204, supplies to the generation device test signals 201 S1-SN$_{sat}$, the estimated code phase $\phi_p$ and the estimated frequency $f_p$, corresponding to the same parameters of CDMA signal associated to a particular satellite $S_j$, previously acquired by the acquisition module 4 and tracked by tracking module 6.

In a generation step 402 (SIG-GENER), test signals generation device 201 generates prompt signal $s_j^{pr}(t_k)$, corresponding to the CDMA-modulated signal of the type of formula (1) having the estimate code $\phi_p$ and estimated frequency $f_p$.

Moreover, test signal generation device 201 generates also the following already defined offset test signals:

anticipated test signal $s_j^E(t_k)$;
delayed test signal $s_j^L(t_k)$;
more anticipated test signal $s_j^{VE}(t_k)$;
more delayed test signal $s_j^{VL}(t_k)$.

Correlators bank 202 of reacquisition device 5 receives also digital signal $S_{RX}(tk)$ corresponding to the one of formula (2) translated to an intermediate frequency $f_{IF}$ and sampled, as supplied by the analog receiving module AFE.

In a correlations calculation step 403 (CORR-COMP), correlators bank 202 calculates the correlation between the digital signal $S_{RX}(t_k)$ and prompt signal $s_j^{pr}(t_k)$, and correlations between digital signal $S_{RX}(t_k)$, the plurality of test signals $s_j^E(t_k)$, $s_j^L(t_k)$, $s_j^{VE}(t_k)$ $s_j^{VL}(t_k)$ obtaining the plurality of correlation results $C_{out1}$-$C_{out5}$.

Particularly, each correlator Cj of the plurality of correlators C1-C3 supplies a narrow band correlation result $C^N_{outj}$ and a broad band correlation result $C^W_{outj}$.

More particularly, referring in an exemplifying way to the third correlator C3, prompt signal $s_j^{pr}(t_k)$ is multiplied by digital signal $S_{RX}(t_k)$ by means of multiplier 301 supplying in-phase digital signal $I_{prx}$ and quadrature digital signal $Q_{prx}$.

Integration module 302 integrates digital signals $I_{prx}(t_k)$ and $Q_{prx}(t_k)$ both by broad band integration module 303 and narrow band integration module 304.

Referring to the broad band integration, first power calculation module 305 calculates, as expressed by formula (7), the plurality of power values $P_i(t_i)$ which are summed in first summing module 306 for obtaining the broad band correlation result $C^W_{out3}$.

Referring to the narrow band integration, second summing module 307 calculates a plurality of cumulative in-phase values $Is_i$ and a plurality of cumulative quadrature values $Qs_i$, as previously described.

Second power calculation module 308 calculates the plurality of power cumulative values $Ps_i$ from the plurality of cumulative in-phase values $Is_i$ and plurality of cumulative quadrature values $Qs_i$, as shown by formula (8).

Second adder 309 sums the plurality of power cumulative values $Ps_i$ one to the other to obtain a narrow band correlation result $C^N_{out3}$. The first, second, fourth and fifth correlators C1, C2, C3, C5 operate in the same way.

Decisional module 203 receives the plurality of correlation results $C_{out1}$-$C_{out5}$ such as for example a plurality of broad band correlation results $C^W_{out1}$-$C^W_{out5}$ and a plurality of narrow band correlation results $C^N_{out1}$-$C^N_{out5}$.

Referring for example to the plurality of narrow band correlation results $C_{out1}$-$C_{out5}$, decisional module 203 determines in a selection step 403 (SELECT), among prompt signal $s_j^{pr}(t_k)$, and the plurality of test signals $s_j^E(t_k)$, $s_j^L(t_k)$, $s_j^{VE}(t_k)$, $s_j^{VL}(t_k)$, which can be selected as signal candidate to the reacquisition $s_j^{acq}(t_k)$.

The signal candidate to the reacquisition $s_j^{acq}(t_k)$ may be a signal corresponding to a maximum value $C_{max}$ of the broad band correlation result among values $C^W_{out1}$-$C^W_{out5}$ and at which such maximum value $C_{max}$ is greater than a determined threshold value. The threshold value may be predetermined.

For example, it is considered, based on a value taken by the fourth broad band correlation result $C^W_{out4}$, the second delayed test signal $s_j^L(t_k)$ is selected as candidate signal $s_j^{acq}(t_k)$. This enables decisional module 203 to define, as selected code phase value $\hat{\phi}$, the code phase associated to the second delayed test signal $s_j^L(t_k)$. Moreover, decisional module 203 evaluates also the calculated Doppler shift value $\hat{f}_d$ from carrier frequency $f_{cs}$ supplied by the numerically controlled oscillator 205, equal to the sum of the estimated carrier frequency $f_p$ and intermediate frequency $f_{int}$, as already said. The calculated Doppler shift $\hat{f}_d$ can be obtained by a known maximum likelihood algorithm based on the function arctangent 2, a tan 2(Q/I), applied to samples I/Q, suitably combined (mixed) one to the other in the observation period. The calculated Doppler shift $\hat{f}_d$ is supplied to tracking module 6 so that the tracking error is null with respect to the digital signal frequency $S_{RX}(t_k)$.

In this example, it is observed, since decisional module 203 has selected the second delayed test signal $s_j^L(t_k)$, and not prompt signal $s_j^{pr}(t_k)$, the selected code phase $\hat{\phi}$ available to tracking module 6 is different from the value of the estimated code phase $\phi_p$ supplied by estimation module 203 and taken by prompt signal $s_j^{pr}(t_k)$.

In an analysis step 404, decisional module 203 determines also a minimum value $C_{min}$ of the broad band correlation results $C^W_{out1}$-$C^W_{out5}$ and performs an analysis based on maximum value $C_{max}$ and minimum value $C_{min}$ of the correlation results, from which it decides whether to confirm the acquisition, or rejects the acquisition of parameters $\hat{\phi}$ and $\hat{f}_d$ associated to the signal candidate to the reacquisition $s_j^{acq}(t_k)$.

More particularly, according to a particular implementation of the analysis step 404, decisional module 203 calculates (calculation step 405) a ratio $R_P$ between minimum value $C_{min}$ and maximum value $C_{max}$ ($R_p = C_{max}/C_{min}$), and compares it (in a first comparing step 406) with a first discrimination value $TH_1$. For example, first discrimination value $TH_1$ may be greater than 1.4 and, in some embodiments, less than 1.6; in some embodiment, it may be equal to 1.5.

If ratio $R_P$ is not greater (branch N, step 406) than first discrimination value $TH_1$, the method continues with a second comparing step 407, wherein ratio $R_P$ is compared with second discrimination value $TH_2$, less than first discrimination value $TH_1$. For example, second discrimination value $TH_2$ may be greater than 1.0 and, less than 1.3; for example equal to 1.2.

When ratio $R_P$ is less than second discrimination value $TH_2$ (branch Y, step 407), decisional module 203 detects an interfering or noise signal (detecting step 408) and therefore detects digital signal $s_{RX}(t_k)$ to be acquired is overlapped by a noise component, in other words is completely absent. This may for example occur when somebody goes through a tunnel and the interfering signal is already present because it is generated from the car electronics.

In this case, decisional module 203 enables the noise detection signal JDETEC for this channel by making this information available at the tracking module 6, while reacquisition signal ACQ and filtering activation signal FILT are kept disabled.

In this situation, the acquisition method 400 ends (first final step 409 END1) without transferring the calculated Doppler shift value $\hat{f}_d$ and selected code phase value $\hat{\phi}$ to tracking module 6 since digital signal $s_{RX}(t_k)$ is assumed not valid. In such situation, a new reacquisition procedure is performed.

Instead, in case ratio $R_P$ is not less than second discrimination value $TH_2$ (branch N, step 407), decisional module 203, in a filtering enabling step 410, enables filtering activation signal FILT and makes it available to tracking module 6.

In this situation, tracking module 6 does not immediately take the calculated Doppler shift value $\hat{f}_d$ and selected code phase value $\hat{\phi}$ for processing, but it waits that its filtering module (not shown) checks whether the CDMA-decoded signal, based on the reacquisition results, is a satellite signal or an interfering signal. This filtering is for example performed by detecting the presence of an interfering signal based on the absence of a statistical alternance of values 0 and 1 in the bit stream associated to the decoded signal.

Referring again to the first comparing step 406, if ratio $R_P$ is greater (branch Y) than first discrimination value $TH_1$, preferably the method continues with a discrimination step 411.

In such discrimination step 411 (SHAP-CLAS), the distribution of the correlation broad band values $C^W_{out1}$-$C^W_{out5}$ is analyzed in order to discriminate between a situation without the noise disturb or a situation of possible presence of the noise disturb such to compromise the reacquisition procedure.

The principle behind such discrimination provides that when the test signal for which the correlation result $C_{max}$ takes its maximum, is the anticipated test signal $s_j^E(t_k)$ or the more anticipated test signal $s_j^{VE}(t_k)$, then, if the test signal for which the correlation $C_{min}$ takes the minimum value, is the more delayed test signal $s_j^{VL}(t_k)$, it is possible to infer there is a situation without the noise disturb (branch Y). Otherwise, if in the previous case the correlation minimum $C_{min}$ occurs for a signal different from the more delayed test signal $s_j^{VL}(t_k)$ then it is inferred that there is a case of possible presence of the noise signal (branch N).

Analogously, when the test signal for which there is the maximum of the correlation result $C_{max}$ is the delayed test signal $s_j^L(t_k)$ or the more delayed test signal $s_j^{VL}(t_k)$, then, if the test signal for which there is the minimum of correlation $C_{min}$ is the more anticipated test signal $s_j^{VE}(t_k)$, it is inferred that there is a case without a noise signal (branch Y). Otherwise, if in the preceding case the minimum of correlation $C_{min}$ occurs at a signal different from the more anticipated test signal $s_j^{VE}(t_k)$, then, it is inferred that there is a situation without the presence of the noise disturb (branch N).

When during the discrimination step 411, it is detected a situation without noise signal (branch Y), decisional module 203 enables the reacquisition signal ACQ (acquisition confirming step 412). In such case, the reacquisition signal ACQ, the calculated Doppler frequency value $\hat{f}_d$, and the value of the selected code phase $\hat{\phi}$ are supplied to the tracking module 6, which will use them for its own processing further detecting the presence of a noise. Reacquisition method 400 therefore ends in a second final step 413 (END2).

When during the discrimination step 411, it is detected a situation of a possible presence of a noise (branch N), the method continues with the above described filtering enabling step 410, wherein decisional module 203 enables filtering activation signal FILT and makes it available to tracking module 6.

Method 400, described with reference to the broad band correlation results $C^W_{out1}$-$C^W_{out5}$, is also simultaneously implemented for the narrow band correlation results $C^N_{out1}$-$C^N_{out5}$ and the selection of the maximum discrimination results of the parameters performed in the correlations calculation step 403, is implemented by considering both the broad band correlation results $C^W_{out1}$-$C^W_{out5}$ and the narrow band correlation results $C^N_{out1}$-$C^N_{out5}$.

In an embodiment, it is observed analysis step 404 of method 400 is performed more times inside an integration time, for example, it is performed at 64 msec from integration start, at 256 msec from the integration start, and at 512 msec from the integration start.

It is also observed, despite in the preceding description of the reacquisition module 5 and reacquisition method 400 it was only considered the reacquisition procedure, based on the estimated code phase $\phi_p$ and on the estimated carrier frequency $f_p$, such method 400 can be also applied to refine the acquisition procedure executed by acquisition module 4. In such case, test signals generator 201 (FIG. 2) does not receive the estimated code phase $\phi_p$ and estimated carrier frequency $f_p$ from estimation module 204, but it receives such parameters from acquisition module 4 of FIG. 1, which calculates them following an acquisition procedure performed also in an undefinite reacquisition condition, such as for example the Hot/Warm Start and Cold Start conditions.

Referring again to the reacquisition method 400, with reference to the first step 406 comparing the first discrimination value $TH_1$ and second step 407 comparing second discrimination value $TH_2$, the Applicant has observed that ratio $R_P$ between maximum result $C_{max}$ and minimum result $C_{min}$ is close to one when the noise signal is present, while is greater than one for satellite signals. This has been also confirmed by experimental tests performed by the Applicant.

In these experimental tests, the Applicant has simulated a reacquisition process by causing an obscuration of all the satellite signals $S_1$-$S_{Nsat}$, after an effective position calculation (fix). During the satellite signals obscuration, a continuous wave-type noise signal was also simulated, in order to simulate a situation which can occur by going through a tunnel.

The reacquisition and therefore the calculation of correlation results $C_{out1}$-$C_{out5}$ and calculation of ratio $R_P$ have been performed according to a procedure analogous to the above described one.

Figure 5A:
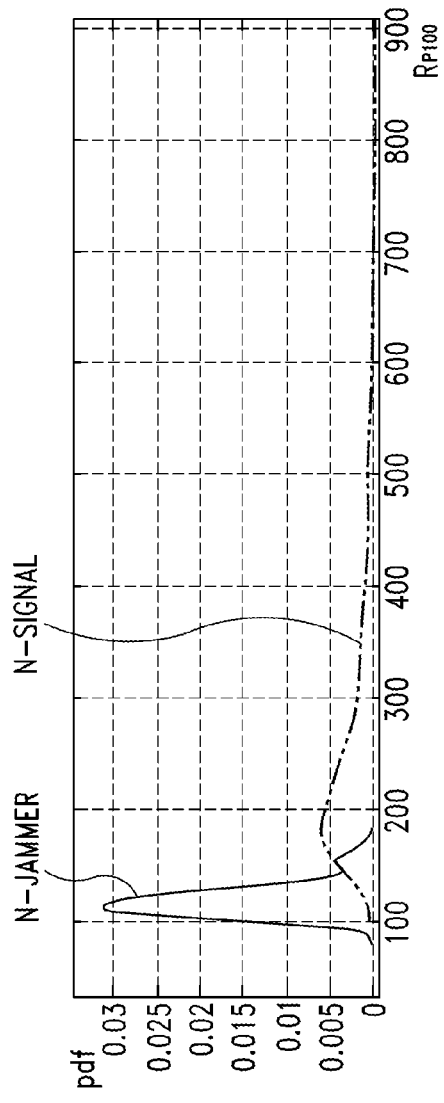
FIG. 5a shows the trends of the probability density function of a ratio between a correlation maximum and minimum when a GNSS-type signal is reacquired and in case of a noise signal, for a narrow band integration.

For this reason, FIG. 5a shows the trend of the probability density function pdf for the ratio between the maximum correlation result and the minimum correlation result $R_{p100}$ ($R_{p100}=C_{max}/C_{min}\times100$) for an effective GNSS-type satellite signal (curve N-SIGNAL) and for a noise signal simulated by a continuous wave (curve N-JAMMER). Satellite signal had a power of 45 dB, while noise signal had a power of 38 dB.

For the satellite signal GPS, curve N-SIGNAL shows an average $\mu$=278.9 and a variance $\sigma$=139.4 and a minimum value min=153.5. For the noise signal, curve N-JAMMER has an average $\mu$=120.6, a variance $\sigma$=14.5, and a maximum value max=167.8.

Figure 5B:
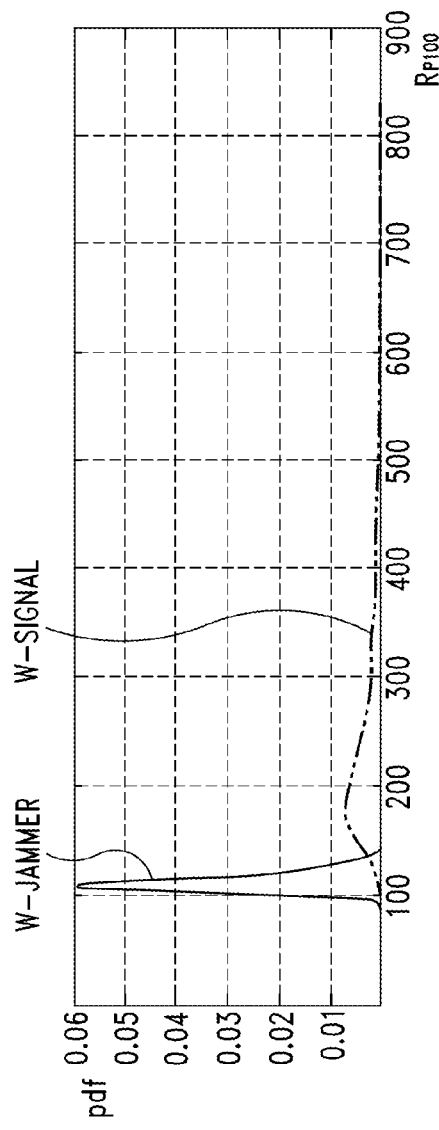
FIG. 5b shows the trends of the probability density function of a ratio between a correlation maximum and minimum when it is reacquired a GNSS-type signal and in the presence of a noise signal, for a broad brand integration.

FIG. 5a refers to a reacquisition procedure comprising a narrow band integration. FIG. 5b shows curves W-SIGNAL and W-JAMMER obtained under the same conditions of FIG. 5a but for a broad band integration.

For satellite signal GNSS, curve W-SIGNAL has an average $\mu$=257.2, a variance $\sigma$=106.3 and a minimum value min=149.1. For the noise signal, curve N-JAMMER has an average $\mu$=112.0, a variance $\sigma$=7.2, and a maximum value max=133.6.

Analysis of FIGS. 5a and 5b confirms ratio $R_{P100}$ is, with high probability, close to 100 when the noise signal is present, while is, with high probability, greater than 100 in case of satellite signals.

Referring to the above described discrimination step 411, the Applicant has understood that the distribution of the maximum and minimum values of the correlation for the five test signals $\{s_j^{VE}(t_k), s_j^E(t_k), s_j^{pr}(t_k), s_j^L(t_k), s_j^{VL}(t_k)\}$ when the reacquisition identifies an effective satellite signal is different from the distribution of maximum and minimum values when the reacquisition occurs in presence of a noise signal. This has been also confirmed by experimental tests performed by the Applicant, shown in FIGS. 6a and 6b.

Figure 6A:
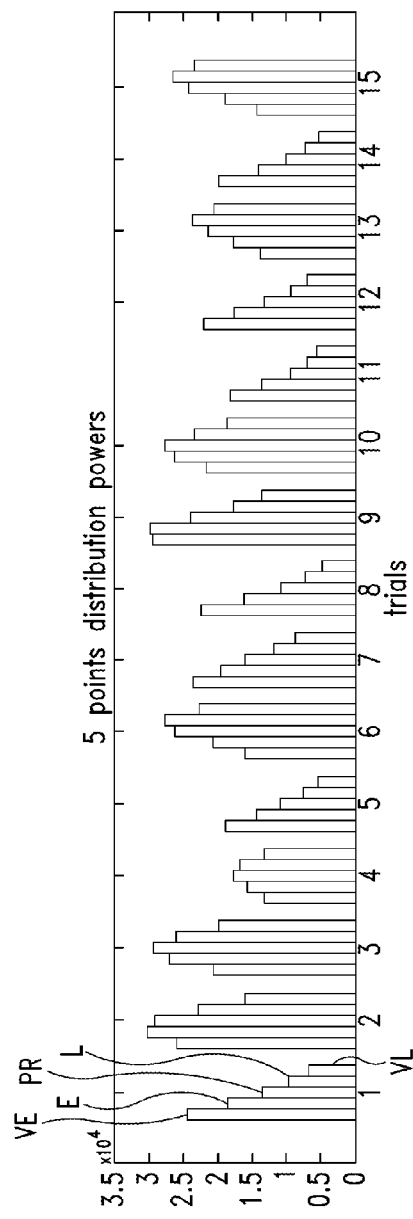
FIG. 6a shows, by histograms, five correlation results obtained during fifteen consecutive calculation tests, in the case of a reacquisition of a GNSS signal.
Figure 6B:
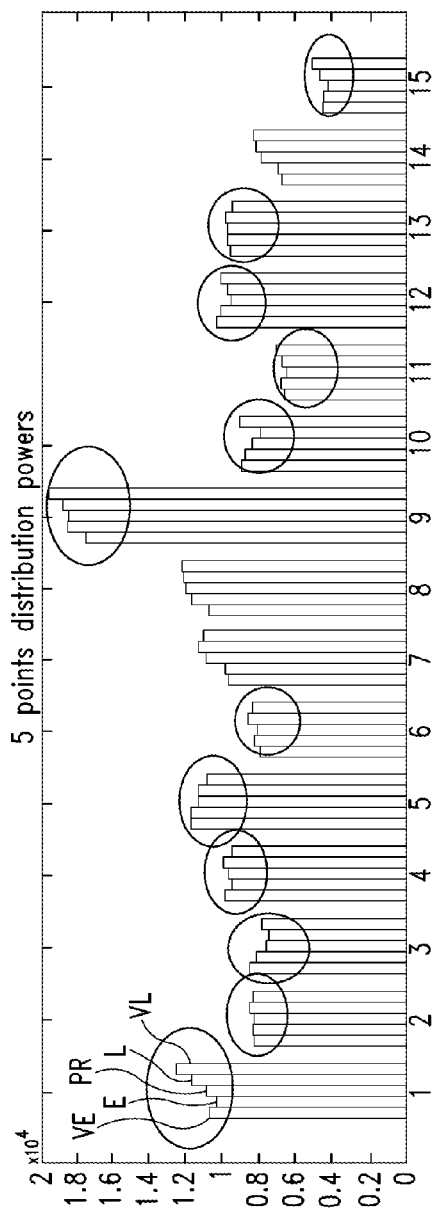
FIG. 6b shows, by histograms, five correlation results obtained during fifteen consecutive calculation tests, in case of a reacquisition in the presence of a noise signal.

FIG. 6b shows, by histograms, the first correlation results $C_{out1}$-$C_{out5}$, obtained by fifteen consecutive calculation tests, when a signal GNSS is reacquired. All the fifteen histograms groups show from the left to the right the corresponding correlation results:

for the more anticipated test signal $s_j^{VE}(t_k)$, histogram VE
for the anticipated test signal $s_j^E(t_k)$, histogram E
for prompt signal $s_j^{pr}(t_k)$, histogram PR,
for delayed test signal $s_j^L(t_k)$, histogram L,
for the more delayed test signal $s_j^{VL}(t_k)$ histogram VL.

FIG. 6b shows, by histograms, the five correlation results $C_{out1}$-$C_{out5}$, obtained in fifteen consecutive calculates tests, in case of a reacquisition in presence of a noise disturb.

From an analysis, FIGS. 6a and 6b are compatible with the discrimination principles described with reference to the discrimination step 411. In fact, by considering, for example, test 1 in FIG. 6a, correlation maximum occurs for histogram VE and the minimum occurs for histogram VL. Instead, by considering for example, test 1 in FIG. 6b, correlation maximum occurs for histogram VL and minimum occurs for histogram E, and not for VE.

The described embodiments may have several advantages. In fact, the described reacquisition method may facilitate preventing the interfering radiofrequency signal, in other words noise signals, from being acquired and therefore subjected to processing steps after the reacquisition, such as tracking, decoding and positioning (see for example the detecting step 408).

Moreover, as said before, reacquisition module 5 and reacquisition method 400 may facilitate improving the precision in determining the code phase, with respect to an estimated one. In fact, as it was illustratively described before, decisional module 203 may select and make available to tracking module 6 a code phase associated to one of the test signals different from prompt signal $s_j^{pr}(t_k)$.

It is also observed the acquisition method 400 may be reliable in detecting noise signals, limiting the consequences of wrong predictions, for example, at the exit of tunnels.

Further, reacquisition method 400 may be advantageous also with reference to processing times. In fact, the possibility of preventing the filtering (see the confirmation step of acquisition 412) executable by tracking module 6 and of directly acquiring the parameters of interest of the satellite signal may facilitate reducing the processing times.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    receiving a CDMA-modulated signal;
    generating a plurality of CDMA-type test signals including a reference test signal having a chip duration, and a plurality of delayed/anticipated test signals offset from the reference test signal by less than the chip duration;
    generating a plurality of correlation results between the CDMA-modulated signal and respective CDMA-type test signals of the plurality of CDMA-type test signals;
    selecting one of the plurality of CDMA-type test signals based on the plurality of correlation results; and
    determining whether to accept one or more acquisition parameters associated with the selected CDMA-type test signal based on the plurality of correlation results.

2. The method of claim 1 wherein determining whether to accept one or more acquisition parameters comprises:
    analyzing a maximum correlation result and minimum correlation result of said plurality of correlation results.

3. The method of claim 1 wherein generating the plurality of the delayed/anticipated test signals comprises:
    generating a first delayed test signal and a first anticipated test signal, respectively delayed/anticipated with respect to the reference test signal by a first offset.

4. The method of claim 3 wherein generating the plurality of delayed/anticipated test signals comprises:
    generating a second delayed test signal, and a second anticipated test signal, respectively delayed/anticipated with respect to the reference test signal by a second offset less than the chip duration and greater than the first offset.

5. The method of claim 2, comprising:
    calculating a ratio between the maximum correlation result and the minimum correlation result of said plurality of correlations results; and
    determining whether to accept one or more acquisition parameters based on said ratio.

6. The method of claim 5, comprising:
    comparing said ratio with a first discrimination value; and
    determining whether to accept one or more acquisition parameters based on the comparison of the ratio with the first discrimination value.

7. The method of claim 2, comprising:
    comparing said maximum correlation result with a first threshold; and
    when the maximum correlation result exceeds the first threshold, identifying one or more parameters of the CDMA-type test signal associated with the maximum correlation result as candidate acquisition parameters.

8. The method of claim 6, comprising, when said ratio is greater than the first discrimination value:
    generating an indication of a noise condition when a distribution of the maximum correlation result and the minimum correlation result among the plurality of CDMA-type test signals is consistent with a noise condition; and
    identifying one or more parameters of the CDMA-type test signal associated with the maximum correlation result as candidate acquisition parameters when the distribution of the maximum correlation result and the minimum correlation result among the plurality of CDMA-type test signals is inconsistent with a noise condition.

9. The method of claim 6, comprising, when said ratio is less than the first discrimination value:
    comparing said ratio with a second discrimination value less than said first discrimination value;
    generating a filter activation signal when the ratio is greater than the second discrimination value; and
    rejecting the one or more acquisition parameters when the ratio is less than the second discrimination value.

10. The method of claim 1, comprising using accepted acquisition parameters in signal source tracking.

11. The method of claim 1 wherein generating the plurality of correlation results comprises:
multiplying the CDMA-modulated signal by one of said test signals to obtain a multiplication digital signal; and
integrating the multiplication digital signal to obtain one of said correlation results.

12. The method of claim 11, wherein said integration comprises at least one of broad band integration and narrow band integration.

13. The method of claim 3, comprising generating the reference test signal based on CDMA parameters estimated by an estimation module.

14. The method of claim 3, comprising generating the reference test signal based on CDMA parameters obtained by a satellite signal acquisition module.

15. A system, comprising:
an antenna configured to receive CDMA-modulated signals;
a receiver coupled to said antenna and configured to convert CDMA-modulated signals to a digital CDMA-modulated signals; and
an acquisition module coupled to the receiver and having:
a test signal generator configured to generate a plurality of CDMA-type test signals including a reference test signal having a first chip duration, and a plurality of delayed/anticipated test signals offset from the reference test signal by less than the chip duration;
a correlation module configured to generate a plurality of correlation results between the CDMA-modulated signal and respective CDMA-type test signals of the plurality of CDMA-type test signals;
a selection module configured to select one of the plurality of CDMA-type test signals based on the plurality of correlation results; and
a determining module configured to determining whether to accept one or more acquisition parameters associated with the selected CDMA-type test signal based on the plurality of correlation results.

16. The system of claim 15 wherein the acquisition module is configured to:
select, based on the correlation results, acquisition parameters associated to a candidate satellite signal; and
acquire or reject the candidate signal based on the correlation results.

17. The system of claim 16 wherein the acquisition module is configured to:
analyze a maximum and minimum result of said plurality of correlation results; and
acquire or reject the selected acquisition parameters based on the analysis of the maximum and minimum results.

18. A device, comprising:
a test signal generator configured to generate a plurality of CDMA-type test signals including a reference test signal having a first chip duration, and a plurality of delayed/anticipated test signals offset from the reference test signal by less than the chip duration;
a correlation module configured to generate a plurality of correlation results between a CDMA-modulated signal and respective CDMA-type test signals of the plurality of CDMA-type test signals;
a selection module configured to select one of the plurality of CDMA-type test signals based on the plurality of correlation results; and
a determining module configured to determining whether to accept one or more acquisition parameters associated with the selected CDMA-type test signal based on the plurality of correlation results.

19. The device of claim 18 wherein the determining module is configured to determine whether to accept the one or more acquisition parameters based on a maximum correlation result and minimum correlation result of said plurality of correlation results.

20. The device of claim 19 wherein the determining module is configured to:
calculate a ratio between the maximum correlation result and the minimum correlation result of said plurality of correlations results; and
determining whether to accept one or more acquisition parameters based on said ratio.

21. The device of claim 20 wherein the determining module is configured to:
compare said ratio with a first discrimination value; and
determine whether to accept one or more acquisition parameters based on the comparison of the ratio with the first discrimination value.

22. The device of claim 21 wherein the determining module is configured to,
when said ratio is greater than the first discrimination value:
generate an indication of a noise condition when a distribution of the maximum correlation result and the minimum correlation result among the plurality of CDMA-type test signals is consistent with a noise condition; and
identify one or more parameters of the CDMA-type test signal associated with the maximum correlation result as candidate acquisition parameters when the distribution of the maximum correlation result and the minimum correlation result among the plurality of CDMA-type test signals is inconsistent with a noise condition.

23. The device of claim 21 wherein the determining module is configured to,
when said ratio is less than the first discrimination value:
compare said ratio with a second discrimination value less than said first discrimination value;
generate a filter activation signal when the ratio is greater than the second discrimination value; and
reject the one or more acquisition parameters when the ratio is less than the second discrimination value.

24. The device of claim 19 wherein the determining module is configured to:
compare said maximum correlation result with a first threshold; and
when the maximum correlation result exceeds the first threshold, identify one or more parameters of the CDMA-type test signal associated with the maximum correlation result as candidate acquisition parameters.

* * * * *